(12) United States Patent
Deason

(10) Patent No.: US 7,962,621 B2
(45) Date of Patent: Jun. 14, 2011

(54) POLICY SERVICE SYSTEM ARCHITECTURE FOR SESSIONS CREATED USING STUN

(75) Inventor: Neil A. Deason, Seattle, WA (US)

(73) Assignee: Microsoft Corporation—One Microsoft Way, Redmond, WA (US)

( * ) Notice: Subject to any disclaimer, the term of this patent is extended or adjusted under 35 U.S.C. 154(b) by 333 days.

(21) Appl. No.: 12/353,014

(22) Filed: Jan. 13, 2009

(65) Prior Publication Data

US 2010/0180028 A1 Jul. 15, 2010

(51) Int. Cl.
*G06F 15/16* (2006.01)
*G06F 15/173* (2006.01)

(52) U.S. Cl. ........ 709/226; 709/203; 709/224; 709/228; 709/229

(58) Field of Classification Search .................. 370/218; 709/229, 231, 226
See application file for complete search history.

(56) References Cited

U.S. PATENT DOCUMENTS

| | | | | |
|---|---|---|---|---|
| 5,933,422 | A * | 8/1999 | Kusano et al. | 370/331 |
| 6,760,774 | B1 * | 7/2004 | Soumiya et al. | 709/226 |
| 6,765,873 | B1 * | 7/2004 | Fichou et al. | 370/235 |
| 6,850,541 | B2 * | 2/2005 | Gross | 709/229 |
| 6,950,391 | B1 * | 9/2005 | Zadikian et al. | 370/219 |
| 2003/0161338 | A1 * | 8/2003 | Ng et al. | 370/437 |
| 2005/0135435 | A1 * | 6/2005 | Ishii | 370/539 |
| 2005/0259586 | A1 * | 11/2005 | Hafid et al. | 370/241 |
| 2006/0098622 | A1 | 5/2006 | Chang et al. | |
| 2006/0146792 | A1 | 7/2006 | Ramachandran et al. | 370/352 |
| 2007/0019619 | A1 | 1/2007 | Foster et al. | 370/352 |
| 2007/0076599 | A1 * | 4/2007 | Ayyagari et al. | 370/229 |
| 2007/0078986 | A1 | 4/2007 | Ethier et al. | 709/227 |
| 2007/0101414 | A1 | 5/2007 | Wing et al. | 726/5 |
| 2007/0206614 | A1 | 9/2007 | Lin | |
| 2008/0091811 | A1 | 4/2008 | Wing et al. | |
| 2008/0095173 | A1 * | 4/2008 | Bugenhagen | 370/395.21 |
| 2008/0198850 | A1 | 8/2008 | Cooper et al. | 370/392 |
| 2008/0253281 | A1 * | 10/2008 | Li et al. | 370/218 |
| 2009/0323632 | A1 * | 12/2009 | Nix | 370/331 |

FOREIGN PATENT DOCUMENTS

WO  WO 2008/084306 A2  7/2008

OTHER PUBLICATIONS

Rosenberg et al, "Session Traversal Utilities for NAT (STUN)," RFC 5389, Oct. 2008, pp. 1-48.

(Continued)

*Primary Examiner* — Quang N. Nguyen
(74) *Attorney, Agent, or Firm* — Merchant & Gould P.C.

(57) ABSTRACT

Described herein are embodiments for setting, managing, and monitoring connection policies for a plurality of network paths from a first endpoint to a second endpoint. In embodiments, a set of candidate addresses from a first endpoint and a set of candidate addresses from a second endpoint are received. Each candidate address of the first endpoint is paired with each candidate address of the second endpoint to create a plurality of candidate address pairs. Each candidate address pair has an associated network path. The network path is the route by which data flows to and from the various endpoints. Once all network paths between each candidate address pair have been determined, a connection policy is set for each network address pair and the associated network path.

16 Claims, 6 Drawing Sheets

OTHER PUBLICATIONS

Wing, D. "View of/dwing/session-auth/draft-wing-session-auth.xml," [online], Mar. 26, 2008, [retrieved on Nov. 17, 2008]. Retrieved from https://svn.resiprocate.org/viewsvn/ietf-drafts/dwing/session-auth/draft-wing-session-auth.xml?revision=2796&view=markup, pp. 1-6.

Atout, Fakher, "NAT/Firewall Traversal: Issues and Solutions." Helsinki University of Technology, TKK T-110.52990 Seminar on Network Security, Dec. 11-12, 2006, pp. 1-5.

Wing, D. "Media Session Authorization draft-wing-session-auth-00," [online], Jan. 31, 2006, [retrieved on Mar. 12, 2009]. Retrieved from: http://tools.ietf.org/id/draft-wing-session-auth-00.txt, pp. 1-14.

International Search Report and Written Opinion mailed Jun. 29, 2010 in International Application No. PCT/US2009/066887.

* cited by examiner

POLICY SERVICE SYSTEM ARCHITECTURE FOR SESSIONS CREATED USING STUN

BACKGROUND

As communication technology continues to expand, it may be desirable to bring together many different forms of communication such as Short Message Services (SMS), Multimedia Message Services (MMS), electronic messaging (email), instant messaging (IM), online presence status, as well as voice and video communications over a network. One such communication type gaining popularity is voice over Internet protocol (VoIP) sessions. Traditionally, VoIP systems interact with traditional public switched telephone networks (PSTN) to enable users to place telephone calls using traditional landline telephones, mobile phones, and other communication devices. Still other communication devices, such as microphones and cameras attached to various computing devices, such as personal computers, also enable VoIP sessions to be established.

One drawback of VoIP is that when voice and/or video data is transmitted over a packet switched network, it competes with other network resources that are being used by traditional data applications. If the network is overloaded there may not be enough bandwidth for each application. As a result, not only will data access and transfers by the traditional applications be affected, but the quality of service of the VoIP session may also be diminished.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described herein are embodiments for setting, managing, and monitoring connection policies for a plurality of network paths from a first endpoint to a second endpoint. In embodiments, a set of candidate addresses from a first endpoint and a set of candidate addresses from a second endpoint are received. Each candidate address of the first endpoint is paired with each candidate address of the second endpoint to create a plurality of candidate address pairs. Each candidate address pair has an associated network path. The network path is the route by which data flows to and from the various endpoints. Once all network paths between each candidate address pair have been determined, a connection policy is set for each network address pair and the associated network path.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Embodiments of the present disclosure may be more readily described by reference to the accompanying drawings in which like numbers refer to like items and in which.

DETAILED DESCRIPTION

Various embodiments are described more fully below with reference to the accompanying drawings, which form a part hereof, and which show specific embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects.

Embodiments generally relate to setting, managing and monitoring connection policies for network paths between two or more endpoints. According to embodiments, each endpoint has one or more candidate addresses. Each candidate address from each of the different endpoints are paired together to create candidate address pairs. A network path that connects the endpoints via the candidate address pairs is then determined and each network path is assigned a policy. The network paths may be used to transfer data between the two endpoints. In embodiments, the data transfer between the endpoints is governed by the policy. For example, a policy may dictate what type of data may be transferred on a network path or the policy may dictate how much bandwidth may be used for the data transfer.

Figure 1:
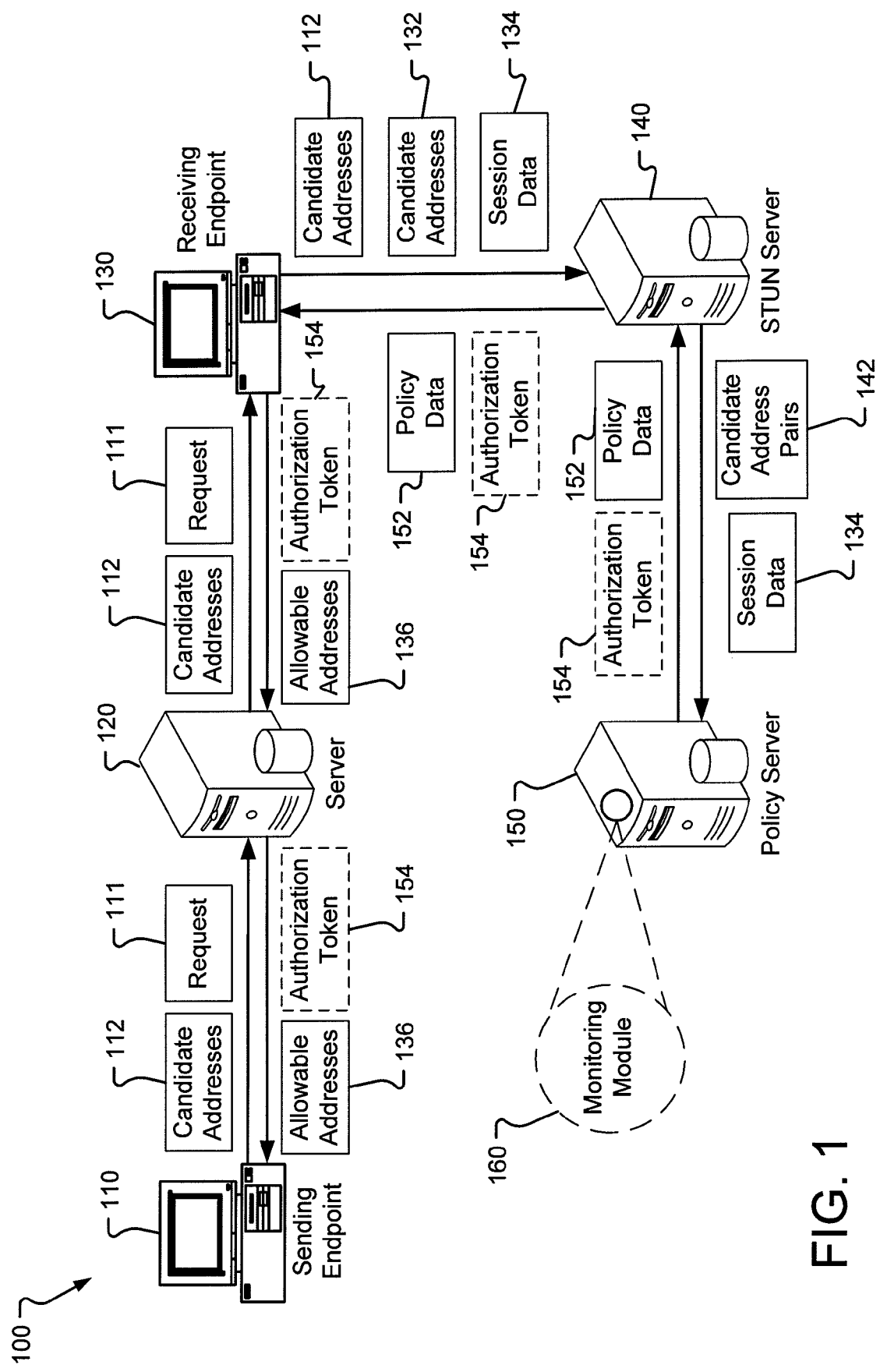
FIG. 1 illustrates a block diagram of a system for setting connection policies for a plurality of network paths according to an embodiment.

FIG. 1 illustrates a system for setting, maintaining and monitoring connection policies for various network paths that exist between two endpoints according to embodiments. As shown in FIG. 1 the system may contain a sending endpoint 110 and a receiving endpoint 130. In an embodiment, the sending endpoint 110 attempts to establish a network session with a receiving endpoint 130. The sending endpoint 110 and the receiving endpoint 130 may be one of a telephone, a mobile or handheld device, a personal computer or laptop, or any other computing device capable transmitting and/or receiving data over a network (not shown). The session may be a voice over Internet Protocol (VoIP) telephony session. As briefly discussed above, VoIP enables voice communications, as well as other data, such as video, to be transmitted over the internet or other networks to a various endpoints. The endpoints may be local endpoints or remote endpoints. Although a VoIP telephony session is specifically mentioned herein, the present specification is not limited to such sessions. It is contemplated that any type of data transfer between endpoints may utilize the methods of the present disclosure.

The sending endpoint 110 may have one or more candidate addresses (e.g., Internet Protocol (IP) addresses) that it may use to establish a data transfer session with a second endpoint. Each endpoint may have the multiple candidate addresses by having more than one local IP address available, being behind a Network Address Translator (NAT), or using the services of a STUN server. As is known in the art, an IP address is a numerical identifier assigned to a device that participates in network session. The IP address uniquely identifies the particular device to/from which data is being sent and received.

In embodiments, when attempting to establish a session with a remote endpoint, such as the receiving endpoint 130, the sending endpoint 110 transmits a request 111, or signaling session, through a signaling layer of the network. The request includes data for setting up and negotiating a session between the sending endpoint 110 and the receiving endpoint 130. The request 111 may be routed through a server 120. According to an embodiment, the server 120 may include a signaling server configured to route the request between the sending endpoint 110 and the receiving endpoint 130. Server 120 may also include a relay server configured to provide additional candidate address to either endpoint that may be used for exchanging data within the session. In another embodiment the relay server and signaling server may be separate entities. The server 120 forwards the request 111 to the receiving endpoint 130. The resulting signaling negotiation session between the two endpoints may rely on a signaling layer protocol session such as the Session Initiation Protocol (SIP).

The information sent by the sending endpoint 110 also includes, with the request 111, a list of candidate addresses 112. The candidate addresses 112 are IP addresses associated with the sending endpoint 110. In an embodiment, the sending endpoint 110 performs a candidate discovery phase during which the sending endpoint 110 discovers IP addresses it may use to establish a network session with another endpoint. Each candidate address may be used to establish network sessions with, and transmit data to/from, local and remote endpoints.

As briefly discussed, the system may also include a server 120. According to embodiments, the server 120 may include a signaling server configured to forward the request 111, along with the candidate addresses 112 of the sending endpoint 110, to the receiving endpoint 130. In embodiments, the receiving endpoint 130 may be an endpoint in the same private network as the sending endpoint 130. Alternatively, the receiving endpoint may be outside the network of the sending endpoint 110. Thus, the request 111 may need to make multiple hops along a network path before reaching the receiving endpoint 130. In an embodiment, the server 120 may also include a relay server configured to provide additional candidate addresses to either the sending endpoint 110 or the receiving endpoint 130. Depending on which endpoint receives the additional addresses, the additional addresses are appended to either endpoint's list of candidate addresses.

Once the session request 111 and the candidate addresses 112 of the sending endpoint 110 have been received by the receiving endpoint 130, the receiving endpoint 130 begins a candidate discovery phase. In the candidate discovery phase, the receiving endpoint 130 determines its own local candidate addresses 132. As part of the candidate discovery phase, the receiving endpoint 130 may discover additional candidate addresses it can use. These additional candidate addresses may be provided by the server 120 or by another server in the system.

Upon completion of the candidate discovery phase, the receiving endpoint 130 transmits a request, the list of candidate addresses 112 from the sending endpoint 110, and its own candidate addresses 132 to a server 140. The request may be the session request 111 first transmitted by the sending endpoint 110. The request may also include a request to allocate the candidate addresses 132 of the receiving endpoint 130 on the server 140.

According to embodiments, server 140 may be a STUN (Session Traversal Utilities for NAT (Network Address Translator)) server. In embodiments, the STUN server is configured to receive both sets of candidate addresses, (e.g., candidate addresses 112 from the sending endpoint as well as the candidate addresses 132 of the receiving endpoint 130) and generate a set of candidate address pairs 142. The candidate address pairs 142 are generated by combining one of the candidate addresses 112 from the sending endpoint 110 with one of the local candidate addresses 132 of the receiving endpoint 130. In embodiments, each candidate address of the sending endpoint 110 is paired with each local candidate address of the receiving endpoint 130. This will be further explained below with reference to FIGS. 3A and 3B.

In embodiments, the STUN server 140 may also have a pool of its own local addresses. When requested, the STUN server 140 will allocate some, or all, of its STUN server addresses to the requesting endpoint 130. In response to the request, the STUN server addresses are added to the list of local candidate addresses 132 of the sending endpoint 130. Therefore, when a session is established between the sending endpoint 110 and the receiving endpoint 130, the addresses known by the STUN server 140 may also be used as candidate addresses of the receiving endpoint 130. In yet other embodiments, the STUN server 140 may also add any NAT addresses to the list of candidate addresses 132 of receiving endpoint 130. When the request 111 transmitted from the receiving endpoint 130 to the STUN server 140 passes through any NATs, each NAT address will also be considered as part of the receiving endpoint's 130 candidate addresses 132.

In other embodiments, receiving endpoint 130 may be required to transmit session data 134 to the STUN server 140. Session data 134 contains information regarding the requested session type between the sending endpoint 110 and the receiving endpoint 130. Many different session types may be requested between the endpoints. Non-limiting examples include a VoIP session, a video session, or a combination VoIP/video session.

Session data 134 may also include a request for bandwidth. Depending on the type of session requested (e.g., VoIP, video, etc.) either the sending endpoint 110 or the receiving endpoint 130 may request that a certain amount of bandwidth be allocated on a network path for the requested session. For example, if the requested session type is a VoIP session, the session data 134 may include a bandwidth request for 50 kbps. If however, the requested session type is a VoIP session with corresponding video data, the requested bandwidth may be 100 kbps.

Upon completion of the candidate address pair 142 generation, the list of candidate address pairs 142 is transmitted to a policy server 150. Based on configuration information corresponding to each candidate address pair, the policy server 150 may determine the subnet that each candidate address of each candidate address pair belongs to. The policy server 150 may map each subnet to various locations and determine the network path that connects the endpoints represented by the candidate address pair.

In an alternative embodiment, the receiving endpoint 130 may contact the STUN server 140 to discover the server addresses of the STUN server 140 as well as any NAT addresses known by the STUN server 140. When the receiving endpoint 130 has received these additional addresses, the receiving endpoint 130 may send these addresses directly to the policy server 150, bypassing the candidate addresses generation phase. The policy server 150 may then determine the network paths that connect each endpoint and determine a policy for each path as described below.

In embodiments, the policy server 150 sets one or more policies for each network path associated with each of the candidate address pairs 142. According to embodiments, the policies are network use policies. For example, the policies may indicate a total amount of bandwidth allowed on each network path, a maximum amount of bandwidth allocated for each session using the network path, a total number of data transfers or phone calls permitted on the particular network path, or any combination thereof. Embodiments provide that each policy is configured, monitored, and maintained by an IT administrator.

In embodiments, the session data 134 may also be transmitted from the STUN server 140 to the policy server 150. As explained above, the session data 134 may include the session type, a requested amount of bandwidth, or a combination thereof. Policy server 150 may be configured to analyze the requested session type and determine which candidate address pairs and associated policies will allow the requested session type. The policy server 150 also determines whether each network path associated with the candidate address pairs allows requested bandwidth amount to be allocated. In yet another embodiment, a policy may prohibit the use of certain candidate address pairs. In such cases, these candidate address pairs pre-fail any connectivity checks that will be performed by the receiving endpoint 130 as will be described in greater detail below.

When these determinations have been made, the policy server 150 transmits policy data 152 to the STUN server 140. The STUN server 140 then transmits, in a response message, the policy data 152 to the receiving endpoint 130.

In embodiments, policy data 152 includes the candidate address pairs 142, the associated network paths, and the network use policies for each path. Because each endpoint potentially has multiple candidate addresses both the sending and receiving endpoints may have multiple network paths to choose from when establishing the session. Having multiple network paths available provides a fall back mechanism in situations in which one of the network paths fail, when a policy of one of the network paths does not permit the requested connection type, or when one of the network paths does not have the requested resources available. For example, if a requested amount of bandwidth is not available on one network path, another network path with the available bandwidth may be selected.

In another embodiment, policy data 152 may only include candidate address pairs having policies that allow the requested session type indicated by the policy data 152. For example, if the requested session type included a session for transferring both audio and video data, the policy server 150 would only include the candidate address pairs having policies that allow the transfer of both audio and video data across a network path.

Other embodiments provide that policy server 150 may generate an authorization token 154. The authorization token 154 is transmitted, along with the policy data 152, to the server 120 (e.g. signaling server). The authorization token ensures that endpoints cannot subvert policy and continue to setup a session without a valid token. Acceptance of the authorization token 154 by either endpoint may be required to complete the negotiation session between the endpoints. In embodiments, the authorization token 154 is transmitted to the sending endpoint 110 from the receiving endpoint 130 as part of a response to the signaling request 111.

When receiving endpoint 130 receives a response, including the policy data 152 from the STUN server 140, the receiving endpoint 130 may perform a STUN connectivity check. As part of the connectivity check, any network paths that have policies that do not allow the requested session will automatically fail. Additionally, if policy prohibits the use of a particular candidate pair, that particular candidate address pair will have already pre-failed the connectivity check. Receiving endpoint 130 will transmit only allowable addresses 136 (e.g., the network address pairs and the associated network paths that allow the requested session type) to sending endpoint 110. Thus, a session may be negotiated between the two endpoints using only network paths that support the requested session type.

In yet other embodiments, the receiving endpoint 130 and the sending endpoint 110 may each perform connectivity checks. Because each endpoint may perform connectivity checks, cases may arise where one endpoint (e.g. the sending endpoint 110) does not know that a particular candidate address pair has pre-failed a connectivity check performed at the other endpoint (e.g., the receiving endpoint 130). In such cases, the sending endpoint 110 may still attempt a connectivity check using the pre-failed candidate address pair. When the connectivity check is performed on the pre-failed candidate address pair at the sending endpoint 110, the receiving endpoint 130 will ignore the attempted connectivity check associated with the pre-failed candidate address pair. Because the connectivity check was ignored at the receiving end, the sending endpoint 110 will treat the pre-failed candidate address pair as having failed the connectivity check. Thus, the pre-failed candidate address pair will not be used for the session.

Embodiments provide that either the sending endpoint 110 or the receiving endpoint 130 may select which network path of the multiple network paths is to be used for the session. The determination may be made based on the first identified network path that permits the requested session. Alternatively, a ratings system may be implemented in which the network paths are given a quality of service rating by the policy server. The rating factors may include session quality metrics monitored by a system module. In yet other embodiments, the rating may be based on whether each network path allows the requested session type and/or has the requested bandwidth available. In still yet other embodiments, the ratings system may be a combination of any of the above.

It is also contemplated that some requested session types may not be allowed on a network path due to policy restrictions or the requested bandwidth is simply not available on any of the network paths. For example, session data 134 may indicate that an audio/video session is the requested session type. Furthermore, the session data 134 may request that a transfer rate of 100 kbps be allocated on the network path for the audio/video session. Once all address pairs have been evaluated and their respective policies determined, it may be discovered that none of the resulting candidate address pairs, nor their associated network paths, allow either the requested session type (e.g. audio/video session) or have the requested bandwidth (e.g., 100 kbps) available.

In such instances, embodiments provide that either the receiving endpoint 130 or the sending endpoint 110 may modify the requested session type and/or the requested bandwidth to bring the request within the parameters of at least one of the policies associated with one of the network paths. Continuing the example from above, the receiving endpoint 130 may modify the session type to be an audio session only. As a result, the receiving endpoint 130 transmits to the sending endpoint 110 the allowable addresses 136 (e.g. candidate address pairs) having policies that allow for the requested audio session to occur.

Other embodiments provide that the system of FIG. 1 also includes a monitoring module 160. The monitoring module 160 is configured to monitor each network path between the endpoints and report session quality metrics to the policy server 150. The monitoring module 160 may be configured to receive reports from the endpoints involved in the session as to the quality of the experience. Other embodiments provide that the monitoring module may also receive reports regarding whether the policy for the network path is being adhered to, the quality of service (QoS) on the network path, whether the session is still established between the endpoints, an amount of bandwidth being used for each session using the network path, available bandwidth on the network path, and a total number of sessions currently using the network path. The module 160 enables the policy server 150 to make informed decisions when setting policies for new sessions that are to be established between a new set of endpoints having candidate addresses that will use or cross the same network paths.

Figure 2:
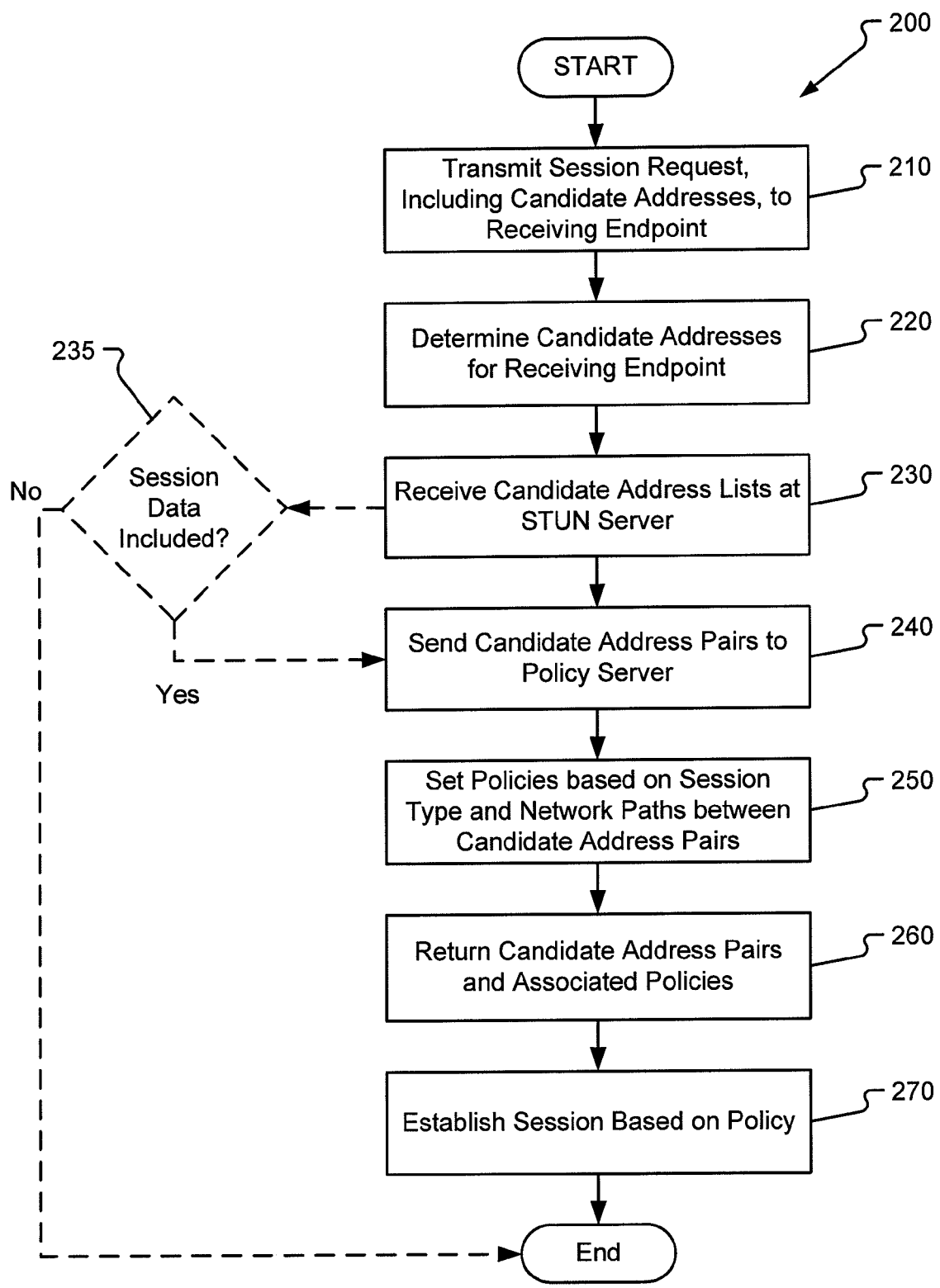
FIG. 2 is an operational flow for setting connection policies for a plurality of network paths according to an embodiment.

FIG. 2 illustrates an operational flow 200 for setting connection policies for a plurality of network paths according to an embodiment. Operational flow 200 may be performed in any suitable computing environment. For example, the operational flow may be executed by systems such as the system described in FIG. 1. Therefore, the description of operational flow 200 may refer to at least one of the components of FIG. 1. However, any such reference to components of FIG. 1 are for descriptive purposes only.

Operational flow 200 begins at step 210 in which a receiving endpoint 130 (FIG. 1) receives a signaling request from a sending endpoint 110. Included with the signaling request are multiple candidate addresses available to the sending endpoint 110. According to embodiments, the signaling request may be transmitted from the sending endpoint 110 to the receiving endpoint 130 via a signaling layer protocol such as the Session Initiation Protocol (SIP).

When the signaling request and candidate addresses have been received, step 220 provides that the receiving endpoint 130 enters into a candidate discovery phase. During the candidate discovery phase, the receiving endpoint 130 identifies all local candidate addresses known by the receiving endpoint 130.

Step 230 provides that the candidate addresses received from the sending endpoint 110 and the candidate addresses from the receiving endpoint 130 are received at the server. According to embodiments, the server is a STUN server 140. The sending endpoint 130 may, as part of the candidate discovery phase, transmit a request to the STUN server 140 requesting that the STUN server 140 allocate IP addresses stored on the STUN server as candidate addresses of the receiving endpoint 130. Thus, the receiving endpoint 130 can use both its own local candidate addresses as well as the IP addresses stored on the STUN server 140 when establishing a session. Additionally, step 230 provides that in the event the request transmitted from the receiving endpoint 130 to the STUN server 140 passed through a NAT, the STUN server also includes the NAT address as candidate addresses of the sending endpoint 130. As a result, the final list of the candidate addresses of the receiving endpoint 130 may contain the receiving endpoint's local candidate addresses, the STUN server's locally stored IP addresses, as well as any NAT addresses passed through by the request.

Step 230 also provides for generating a list of candidate address pairs. According to embodiments, each candidate address in a list of candidate addresses from the sending endpoint 110 is paired with each candidate address from a list of candidate addresses of the receiving endpoint 130. As explained above, candidate addresses from the sending endpoint 110 may also be paired with the addresses allocated from the STUN server, addresses from a relay server, and/or any possible NAT addresses that have been included as candidate addresses of the receiving endpoint 130. The resulting candidate address pairs are an n×n matrix of candidate addresses, where each candidate address from one endpoint is paired with every other unique address from the second endpoint.

In embodiments, the STUN server may require that session data corresponding to the requested session type be received from one of the endpoints. The session data may also include a requested amount of bandwidth for the session, although it may not be required.

In embodiments where session data is required, flow may pass to step 235. Step 235 determines whether session data has been received at the STUN server 140. If session data, indicating at least the requested session type is not received, the session request ends and a session will not be established between the endpoints. In other embodiments, if session data, indicating at least the session type is received, flow may proceed to step 240. In embodiments when a request for bandwidth has not been included in the session data, the session can use a maximum amount of bandwidth allocated by a policy for that particular type of session.

For example, if session data indicates that an audio session is the requested session type but a bandwidth request has been omitted, the requested session type will be established on a network path having a policy that allows the requested session, but the system will only allocate a default amount of bandwidth (e.g., 50 kbps) for the session. In yet other embodiments, the STUN server may require that both the session type and requested/required bandwidth be contained in the session data or the request will fail.

In step 240, the candidate address pairs are transmitted to a policy server 150. Step 250 provides that a network path for each candidate address pair is determined by the policy server 150. The policy server then determines and/or sets a policy for each network path and its associated candidate address pair. According to embodiments, the policy may set a maximum amount of bandwidth allowed for the requested session type. In other embodiments the policies may set a maximum number of sessions or a maximum number of calls on a particular network path. Still other policies may govern what session types may be established on the various network paths.

When the policies have been set for each network path, step 260 provides that the candidate address pairs, the associated network paths, along with the associated policies are returned to the STUN server 140. In embodiments, the STUN server 140 may compare the requested session type, indicated by the session data, with each of the network address pairs and the associated policies. If some of the network paths do not support the requested session type, or some of the network paths do not have the required/requested bandwidth available, or the network paths are currently unavailable, these particular network paths will fail the STUN server's connectivity check. As a result, these particular network paths will be removed from the candidate address pairs (e.g. policy data 152) prior to being returned to the receiving endpoint 130. In alternative embodiments, all network address pairs are returned to the receiving endpoint 130 and the connectivity checks are performed by the receiving endpoint 130. The resulting allowable addresses 136 may then be transmitted to the sending endpoint 110.

When the candidate address pairs have been transmitted to the receiving endpoint 130 from the STUN server 140, the receiving endpoint 130 may send each allowable address 136 to the sending endpoint 110. The allowable addresses 136 may include each network address pair and associated policy that permits the requested session type. The allowable addresses 136 may be included as a response to the signaling session that was first transmitted by the sending endpoint 110. Once received, the requested session is established using at least one of the network paths and its associated policy.

Figure 3A:
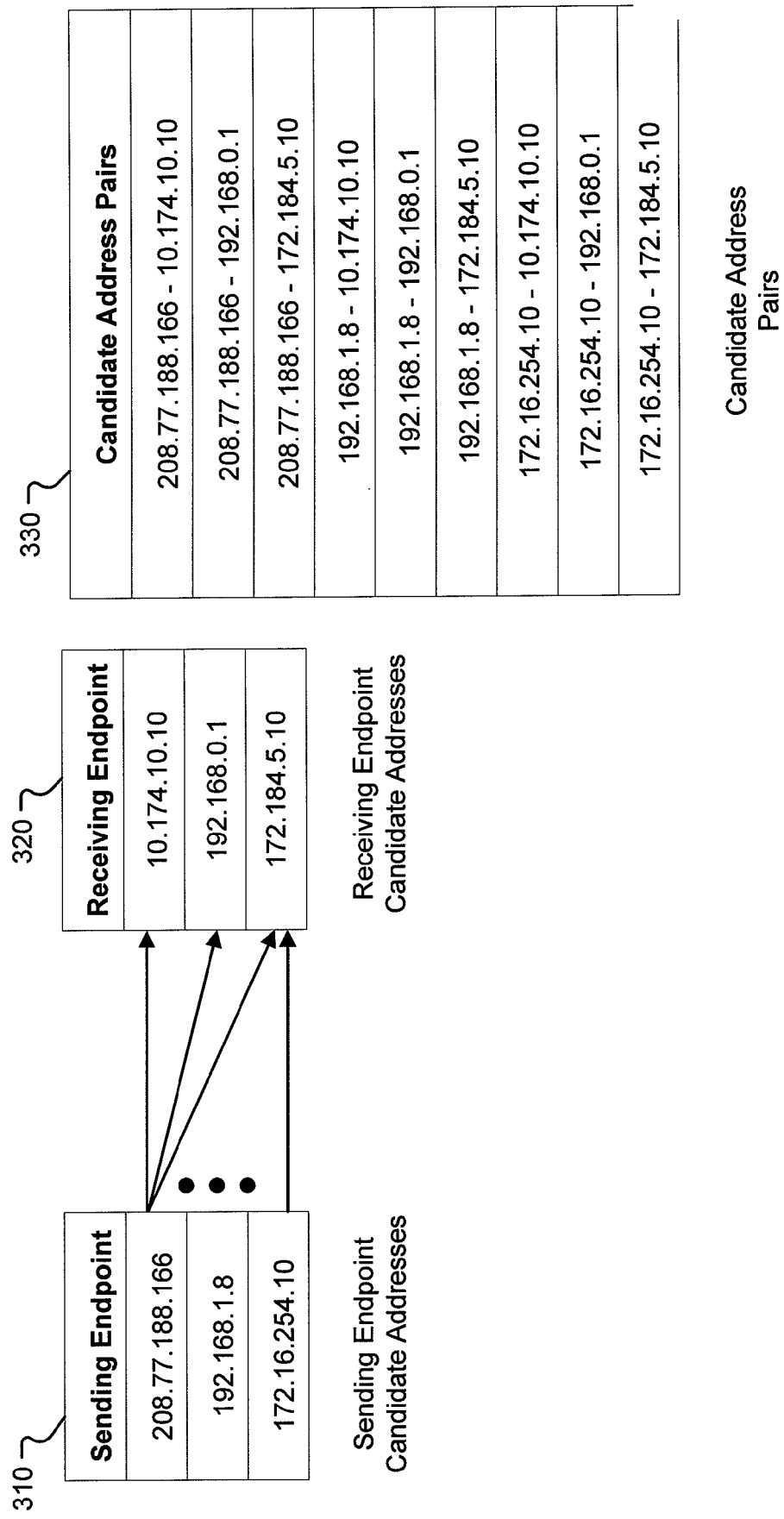
FIGS. 3A and 3B illustrate sample candidate address lists and the resulting candidate address pairs according to an embodiment.
Figure 3B:
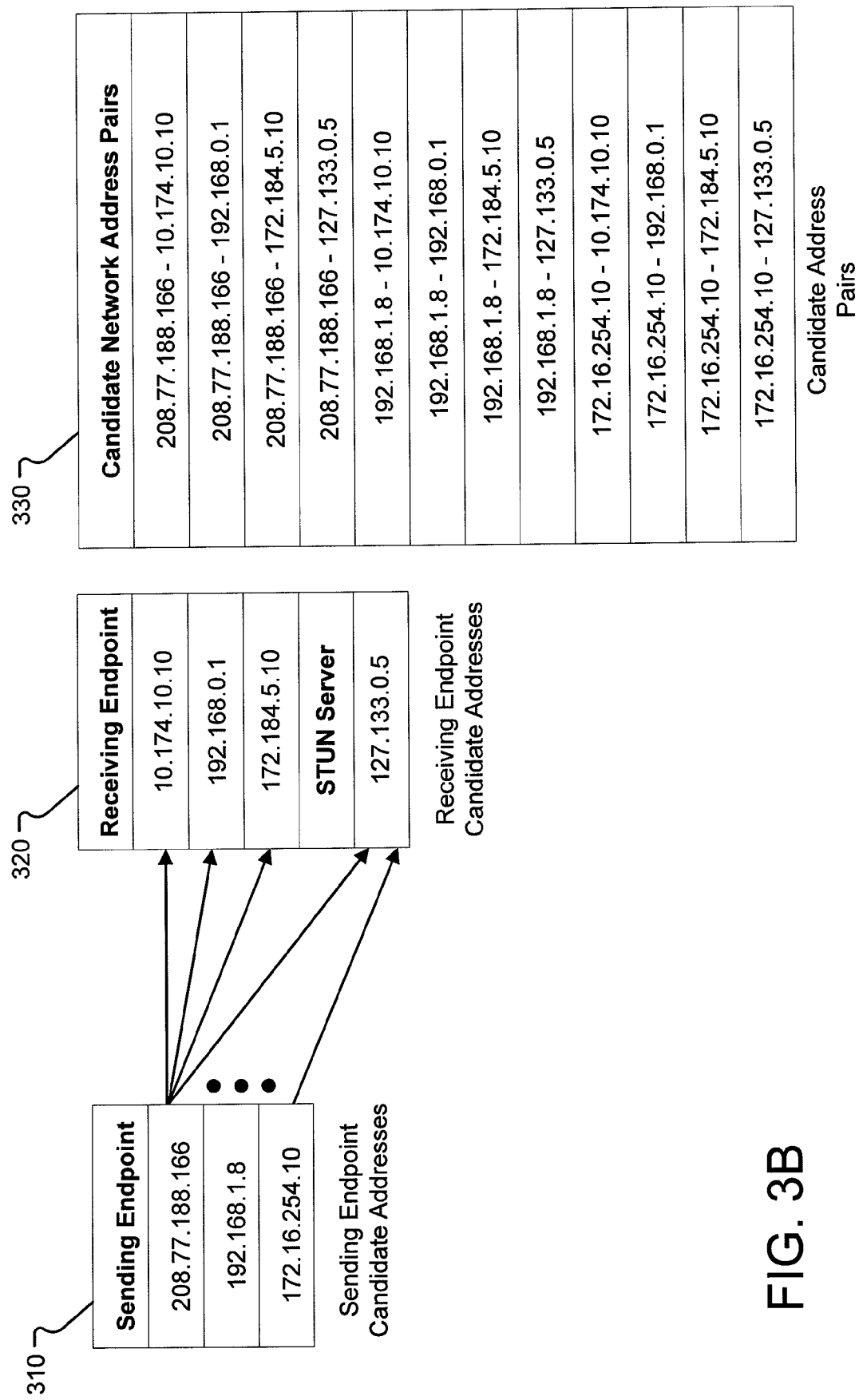

FIGS. 3A and 3B illustrate sample candidate address lists and the resulting candidate address pairs according to an embodiment. The sending endpoint may transmit sending endpoint candidate addresses 310 to a receiving endpoint. As shown in FIG. 3A, the sending endpoint has three candidate addresses available to it when attempting to establish a session. Although the candidate addresses are depicted as IPv4 addresses, it is contemplated that IPv6 addresses may also be used. Additionally, it is contemplated that some of the candidate addresses may be IP addresses on a private network and are routed through a router or a hub. Session requests may be sent from one endpoint to another endpoint on the same private network.

Continuing with the above example, receiving endpoint candidate addresses 320 may also include three different candidate addresses. As with the sending endpoint candidate addresses 310, the receiving endpoint candidate addresses 320 may also be IPv4 and/or IPv6 addresses.

According to embodiments, both sending endpoint candidate addresses 310 and receiving endpoint candidate addresses 320 are transmitted to a server, such as STUN server 140 (FIG. 1). When the candidate addresses are received by the STUN server 140, the STUN server 140 generates candidate address pairs 330. As shown, each candidate address from the sending endpoint candidate addresses 310 is paired with each candidate address from the receiving endpoint candidate 320. The resulting candidate address pairs 320 comprise a one to one mapping of all candidate addresses from both the sending and receiving endpoints.

FIG. 3B illustrates a scenario in which the receiving endpoint candidate addresses 320 has been expanded to include a candidate address (127.133.0.5) that was stored locally on a server, such as STUN server 140 (FIG. 1). Receiving endpoint candidate addresses 320 may also include any NAT addresses that a request may have crossed as it was sent from the receiving endpoint to the STUN server. Much like the candidate address pairings explained above, each candidate address of the sending endpoint candidate addresses 310 is paired with each candidate address of the receiving endpoint candidate addresses 320 to created candidate address pairs 330. The candidate address pairs 330 may then be transmitted to a policy server as described above.

Figure 4:
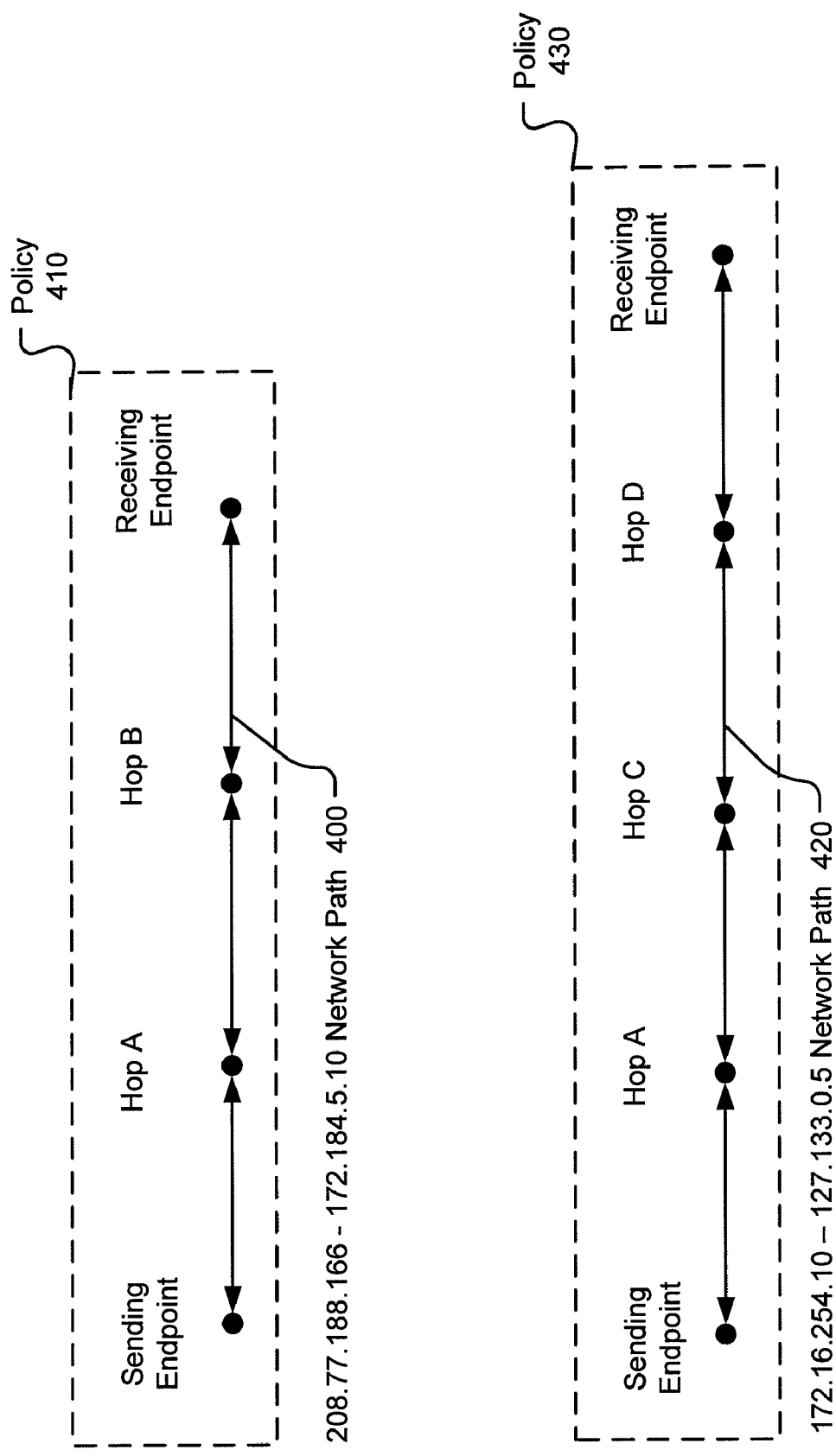
FIG. 4 illustrates sample network paths between a first endpoint and a second endpoint according to an embodiment.

FIG. 4 illustrates sample network paths 400 and 420. According to embodiments, each network path 400 and 420 consists of one of the plurality of candidate address pairs 330 (FIGS. 3A-3B). For example, network path 400 comprises candidate address 208.77.188.166 from the sending endpoint and candidate address 172.184.5.10 from the receiving endpoint. As shown, network path may need to make any number of hops to traverse the network path from the sending endpoint to the receiving endpoint and vice versa.

In embodiments, each of the network paths 400 and 420 may have an associated policy (e.g. policy 410 and 430 respectively). The policy is set by the policy server. When the policies are set for each network path, the candidate address pairs are returned to the receiving endpoint and a determination is made as to which network path will be used for the session. This determination may be made, based in part, on the policy associated with each of the network paths.

For example, session data may indicate that an audio/video type session is being requested. Session data may also indicate a request for bandwidth usage of 150 kbps. When the candidate address pairs, network paths, and policies have been set as described above, the resulting candidate address pairs are returned to the endpoints. A determination is made as to which network path will be used for the requested session.

Continuing with the above example, the policy server may return network path 400 and its associated policy 410 to a receiving endpoint. The policy 410 may limit sessions on the network path 400 to audio sessions only. However, the policy may also indicate that sessions using this particular network path have been allocated bandwidth of 150 kbps. In contrast, the policy 430 for network path 420 may allow audio/video sessions but limit the bandwidth for the session to 100 kbps.

Because neither network path allows for the requested session type or the requested bandwidth, the session request may be tailored to fit within the bounds of either policy 410 or 430. For example, if quality of service is a main concern for the audio portion of the session and video data was not necessarily desired, the session request may be modified to negotiate only audio transfers from each endpoint. As a result, an audio session may be established on network path 400. If however, video is required for the session, network path 420 may be selected and the session request may be modified to fall within the 100 kbps bandwidth requirement set by policy 430. In still yet other embodiments, the session request may only be required to specify the session type. In such embodiments, any network path that allows the specified type of session may be chosen for the session and the session request need not be modified.

When the session has been established between the sending endpoint and the receiving endpoint along a particular network path (e.g., network path 400), the network path may be monitored for bandwidth usage, quality of service and other session quality metrics. This data is transmitted to the policy server. The policy sever is enabled to make informed decisions about what policies to establish on the various network paths when new sessions requests are received and the policy server sets the new policies in light of any existing sessions using each network path.

Figure 5:
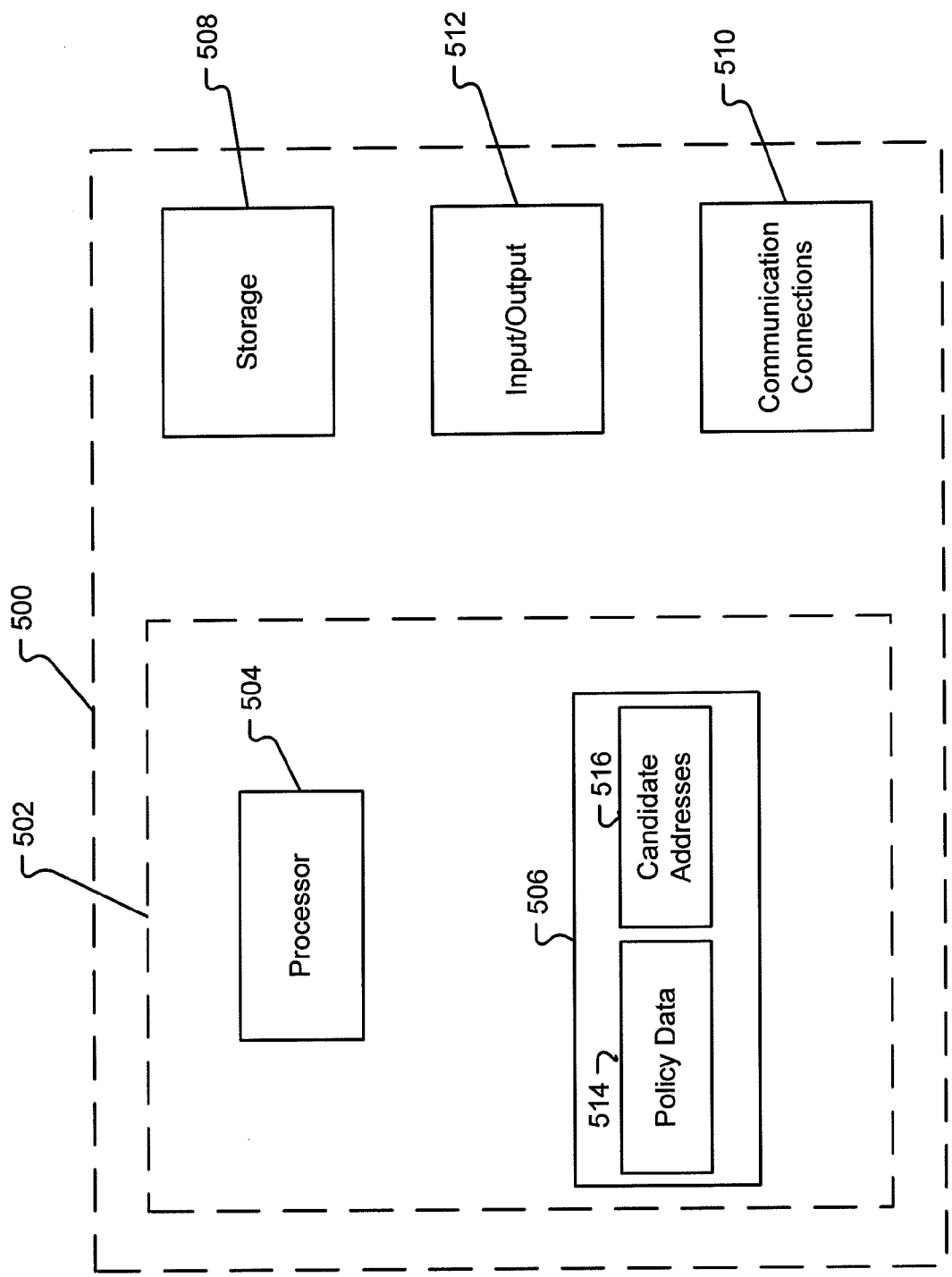
FIG. 5 illustrates a computing environment for implementing embodiments disclosed herein.

With reference to FIG. 5, an embodiment of a computing environment for implementing the various embodiments described herein includes a computer system, such as computer system 500. Any and all components of the described embodiments may execute as or on a client computer system, a server computer system, a combination of client and server computer systems, sending and receiving endpoints, and other possible computing environments or systems described herein. As such, a basic computer system applicable to all these environments is described hereinafter.

In its most basic configuration, computer system 500 comprises at least one processing unit or processor 504 and system memory 506. The most basic configuration of the computer system 500 is illustrated in FIG. 5 by dashed line 502. In some embodiments, one or more components of the described system are loaded into system memory 506 and executed by the processing unit 504 from system memory 506. Depending on the exact configuration and type of computer system 500, system memory 506 may be volatile (such as RAM), non-volatile (such as ROM, flash memory, etc.), or some combination of the two.

Additionally, computer system 500 may also have additional features/functionality. For example, computer system 500 includes additional storage media 508, such as removable and/or non-removable storage, including, but not limited to, magnetic or optical disks or tape. In some embodiments, software or executable code and any data used for the described system is permanently stored in storage media 508. Storage media 508 includes volatile and non-volatile, removable and non-removable media implemented in any method or technology for storage of information such as computer readable instructions, data structures, program modules, or other data.

System memory 506 and storage media 508 are examples of computer storage media. Computer storage media includes RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 500 and processor 504. Any such computer storage media may be part of computer system 500. In embodiments, system memory 506 and/or storage media 508 stores data used to perform the methods or form the system(s) disclosed herein. In embodiments, system memory 506 stores information such as policy data 514 and/or candidate addresses 516.

Computer system 500 may also contain communications connection(s) 510 that allow the device to communicate with other devices. In embodiments, communications connection(s) 510 may be used to transmit and receive messages between sender devices, intermediary devices, and recipient devices. Communication connection(s) 510 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, the methods described above may be transmitted over the communication connection(s) 510.

In some embodiments, computer system 500 also includes input and output connections 512, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 512 are used to display the information as described herein. All these devices are well known in the art and need not be discussed at length here.

In some embodiments, the component described herein comprise such modules or instructions executable by computer system 500 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 500 is part of a network that stores data in remote storage media for use by the computer system 500.

This disclosure described some embodiments of the present disclosure with reference to the accompanying drawings, in which only some of the possible embodiments were shown. Other aspects may, however, be embodied in many different forms and should not be construed as limited to the embodiments or examples set forth herein. Rather, these embodiments and examples were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A method of setting connection policies for a plurality of network paths from a first endpoint to a second endpoint, the method comprising:
   receiving a first set of candidate network addresses of the first endpoint and a second set of candidate network addresses of the second endpoint;
   creating a plurality of candidate network address pairs, wherein each of the plurality of candidate network address pairs comprises a candidate network address of the first set of candidate network addresses paired with a candidate network address of the second set of candidate network addresses;
   associating a network path with each of the plurality of candidate network address pairs;
   setting a connection policy for each of the plurality of candidate network address pairs and the associated network paths, wherein the connection policy sets an amount of bandwidth available for each of the associated network paths;
   pre-failing one or more of the associated network paths when the one or more of the associated network paths does not have enough available bandwidth to establish a session between the first endpoint and the second endpoint; and
   establishing a session between the first endpoint and the second endpoint, wherein the session is established using a network path associated with one of the plurality of candidate network address pairs that has enough available bandwidth to establish the session.

2. The method of claim 1, further comprising receiving session data, wherein the session data indicates a type of session to be established between the first endpoint and the second endpoint.

3. The method of claim 2, wherein the session data includes a bandwidth request that indicates an amount of bandwidth requested for the type of session.

4. The method of claim 2, wherein the type of session is one of a voice-over internet protocol session, a video session, and a joint video voice-over internet session.

5. The method of claim 1, further comprising monitoring the established session to determine compliance with the connection policy associated with the network path used for the established session.

6. The method of claim 1, further comprising periodically monitoring the established session to determine quality of experience on the network path used for the established session.

7. A computer storage medium not consisting of a modulated data signal and encoding computer executable instructions that when executed by a processor perform a method for setting connection policies for a plurality of network paths, the method comprising:
  receiving, by a server, a list of candidate network addresses from a first endpoint and a list of candidate network addresses from a second endpoint;
  combining one or more candidate network addresses known by the server with the list of candidate network addresses received from the second endpoint to create a combined list of candidate network addresses;
  associating each candidate network address from the list of candidate network addresses of the first endpoint with each candidate network address from the combined list of candidate network addresses of the second endpoint to create a plurality of candidate network address pairs;
  associating a network path with each of the plurality of candidate network address pairs;
  setting a connection policy for each of the plurality of candidate network address pairs, wherein the connection policy sets an amount of bandwidth available for each of the associated network paths;
  pre-failing one or more of the associated network paths when the one or more of the associated network paths does not have enough available bandwidth to establish a session between the first endpoint and the second endpoint; and
  establishing a session between the first endpoint and the second endpoint, wherein the session is established using a network path associated with one of the plurality of candidate network address pairs that has enough available bandwidth to establish the session.

8. The computer storage medium of claim 7, further comprising receiving session data prior to establishing the session, wherein the session data indicates a type of session to be established between the first endpoint and the second endpoint.

9. The computer storage medium of claim 7, further comprising receiving session data prior to establishing the session, wherein the session data indicates a desired amount of bandwidth for the session.

10. The computer storage medium of claim 9, further comprising altering the desired amount of bandwidth for the session when it is determined that the connection policy for a selected one of the plurality of candidate network address pairs does not have the desired amount of bandwidth available.

11. The computer storage medium of claim 7, further comprising monitoring the established session to determine compliance with the connection policy.

12. The computer storage medium of claim 7, further comprising monitoring the established session to determine an amount of bandwidth available on the network path used for the established session.

13. The computer storage medium of claim 7, further comprising determining whether one or more of the candidate network addresses known by the server is behind a network address translator.

14. A system for setting connection policies for a plurality of network paths, the system comprising:
  a first server device configured to receive a first list of candidate network addresses from a first endpoint and a second list of candidate network addresses from a second endpoint, wherein the first server device is further configured to associate each candidate network address from the first endpoint with each candidate network address from the second endpoint to create a plurality of candidate network address pairs, each of the plurality of candidate network address pairs having an associated network path; and
  a policy server device configured to set one or more policies for each of the plurality of candidate network address pairs, wherein each of the one or more policies sets an amount of bandwidth available for each of the associated network paths;
  pre-failing one or more of the associated network paths when the one or more of the associated network paths does not have enough available bandwidth to establish a session between the first endpoint and the second endpoint; and
  establishing a session between the first endpoint and the second endpoint, wherein the session is established using a network path associated with one of the plurality of candidate network address pairs that has enough available bandwidth to establish the session.

15. The system of claim 14, wherein the first server device is a STUN server.

16. The system of claim 14, further comprising a feedback module configured to periodically send session data about an established session between the first endpoint and the second endpoint to the policy server.

* * * * *